(12) United States Patent
Maezawa et al.

(10) Patent No.: US 7,193,225 B2
(45) Date of Patent: Mar. 20, 2007

(54) RADIATION IMAGE CONVERSION PANEL AND PREPARATION METHOD THEREOF

(75) Inventors: Akihiro Maezawa, Hino (JP); Noriyuki Mishina, Ome (JP)

(73) Assignee: Konica Corporation, Tokyo (JP)

( * ) Notice: Subject to any disclaimer, the term of this patent is extended or adjusted under 35 U.S.C. 154(b) by 462 days.

(21) Appl. No.: 10/644,154

(22) Filed: Aug. 20, 2003

(65) Prior Publication Data

US 2004/0041100 A1 Mar. 4, 2004

(30) Foreign Application Priority Data

Aug. 29, 2002 (JP) .............................. 2002-250499
Mar. 14, 2003 (JP) .............................. 2003-069583

(51) Int. Cl.
*G03B 42/08* (2006.01)

(52) U.S. Cl. ...................................... 250/484.4; 427/69

(58) Field of Classification Search ............. 250/484.4; 427/69
See application file for complete search history.

(56) References Cited

U.S. PATENT DOCUMENTS

| 6,396,066 B1* | 5/2002 | Chen et al. ............... 250/488.1 |
| 2003/0034458 A1* | 2/2003 | Isoda et al. ............... 250/484.4 |
| 2004/0026632 A1* | 2/2004 | Struye et al. ............. 250/484.4 |

* cited by examiner

*Primary Examiner*—David Porta
*Assistant Examiner*—Djura Malevic
(74) *Attorney, Agent, or Firm*—Lucas and Mercan

(57) ABSTRACT

A radiation image conversion panel is disclosed, comprising on a support at least one stimulable phosphor layer comprising a stimulable phosphor, wherein the stimulable phosphor layer is a layer of vapor-deposited stimulable phosphor having a thickness of 50 μm to 20 mm, and the support exhibits a thermal conductivity of 0.1 to 20 W/mK. A preparation method thereof is also disclosed.

12 Claims, 2 Drawing Sheets

RADIATION IMAGE CONVERSION PANEL AND PREPARATION METHOD THEREOF

FIELD OF THE INVENTION

The present invention relates to a radiation image conversion panel and a method for preparing the same.

A radiation image conversion panel comprising on a support at least one stimulable phosphor layer comprising a stimulable phosphor, wherein the stimulable phosphor layer which was formed by vapor deposition has a thickness of 50 µm to 20 mm, and the support is comprised of a polymeric compound.

Recently, a radiation image conversion panel using a stimulable phosphor containing an alkali halide such as CsBr as a basic substance and Eu as an activator, and the use of activator Eu leading to enhanced X-ray conversion efficiency, which has formerly not been achieved. However, Eu has properties that thermal diffusion is marked and a vapor pressure is relatively high under vacuum, producing problems that Eu is easily scattered and localizes in the basic substance. As a result, it becomes difficult to attain enhanced X-ray conversion efficiency by using Eu as an activator and practical use in the market has not yet achieved.

Further, in the technology of using rare earth elements such as Eu as an activator, it was difficult to achieve superior homogeneity of an activator in the formation of a vapor deposit layer under vacuum, only by controlling vapor pressure characteristics as described, for example, in JP-A 2002-72381, 2002-20742 and 2002-6092 (hereinafter, the term, JP-A refers to Japanese Patent Application Publication). Specifically when a stimulable phosphor layer was formed through vapor deposition, there were often conducted heating treatments, such as heating raw material, heating a substrate (or support) during vacuum deposition and annealing (for relaxation of substrate strain) after forming the layer, so that the existing state of the activator was varied, causing inhomogeneous presence of an activator. However, any of such heating treatments is indispensable to enhance durability of the stimulable phosphor layer.

Accordingly, improvements were desired with respect to luminance, sharpness and homogeneity of the activator contained in the phosphor layer, as required as a radiation image conversion panel on the market.

SUMMARY OF THE INVENTION

It is an object of the present invention to provide a radiation image conversion panel exhibiting superior homogeneity of an activator in a stimulable phosphor layer (hereinafter, also denoted simply as a phosphor layer) and enhanced luminance and sharpness, and a preparation method of the same.

The foregoing object can be accomplished by the following constitution:

1. A radiation image conversion panel comprising on a support at least one stimulable phosphor layer, wherein the stimulable phosphor layer is formed by a process comprising depositing a stimulable phosphor on the support by vapor deposition so as to have a layer thickness of 50 µm to 20 mm and the support exhibiting a thermal conductivity of 0.1 to 20 W/mK.
2. A method of preparing a radiation image conversion panel comprising on a support a stimulable phosphor layer, the method comprising:
   depositing a stimulable phosphor on the support by vapor deposition to form the stimulable phosphor layer, wherein the support exhibits a thermal conductivity of 0.1 to 20 W/mK.

Thus, the inventors of this application noted a thickness of a stimulable phosphor layer which was formed by a vapor deposition process and as a result of study, it was found that allowing a thermal conductivity of a support used in the stimulable phosphor panel as well as the phosphor layer thickness to fall within the range of this invention led to an activator homogeneously dispersed in the phosphor layer, whereby a radiation image conversion panel exhibiting enhanced luminance and improved sharpness was obtained.

DETAILED DESCRIPTION OF THE INVENTION

Figure 1:
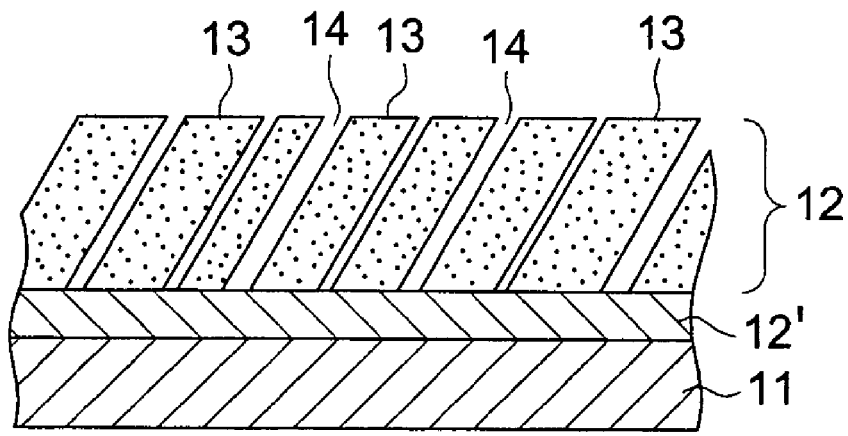
FIG. 1 illustrates a stimulable phosphor layer having columnar crystals formed on the support by a process of vapor deposition (or vapor phase growth).

One aspect of this invention is directed to a radiation image conversion panel comprising on a support a stimulable phosphor layer, wherein the stimulable phosphor layer is a layer of a layer of vapor-deposited stimulable phosphor, that is, a stimulable phosphor is deposited on the support (or substrate) by the vapor deposition process, and the support exhibiting a thermal conductivity of 0.1 to 20 W/mK. In one preferred embodiment of this invention, the use of a support (hereinafter, also denoted as a substrate) which is comprised of polymeric material exhibiting a thermal conductivity of 0.1 to 20 W/mK results in a uniform heat distribution and heat dissipation in the course of forming columnar crystals on the substrate, leading to columnar crystals having a small top diameter and a relatively short height and forming a homogeneous activator distribution in the phosphor layer.

The thermal conductivity can be determined in the manner commonly known in the art, for example, in accordance with JIS R1611-1997 using a measuring apparatus, for example, a laser flash method thermophysical property measuring apparatus, LA-502 (available from Kyoto Denshikogyo Co., Ltd.). As a polymeric material exhibiting a thermal conductivity of 0.1 to 20 W/mK, for example, resin-impregnated carbon fiber is usable in this invention. Specific examples of commercially available one include carbon fiber #132 (available from Toho Rayon Co., Ltd., epoxy resin-impregnated).

The support used in this invention is preferably provided thereon with an adhesive layer containing a compound exhibiting a glass transition point (Tg) of 80 to 350° C., thereby leading to further enhanced effects of this invention. Means for providing the adhesive layer on the support include, for example, a lamination method and a coating method. The adhesive layer is preferably 5 to 50 µm thick. Examples of the compound exhibiting a glass transition point (Tg) of 80 to 350° C. include polyimide, polyethylene terephthalate, paraffin and graphite.

In this invention, the adhesive layer and the support is laminated by applying heat and pressure to a roll during the roll transport. Thus, lamination is performed by using a heated pressure roll, and the roll is heated preferably at a temperature of 80 to 150° C. and a pressure of 4.90×10 to 2.92×10² N/cm, and transportation is conducted preferably at a speed of 0.1 to 2.0 m/sec. In cases where employing a substrate comprising plural layers, lamination of the layers is important, for example, poor precision in adhesion between the layers results in protrusions due to being non-uniformly heated, rendering it difficult to form a homogeneous activator distribution in the phosphor layer. Accordingly, using a heated pressure roll in the course of transportation to perform lamination enables to form plural layer on the support, exhibiting enhanced flatness, leading to a homogeneous activator formation in the phosphor layer after vapor deposition. The homogeneous activator formation in the phosphor layer means that the activator content of the support side of the phosphor layer is substantially the same as that of the surface side of the phosphor layer. Concretely, the activator content of the support side coincides with that of the surface side preferably within ±10%. For example, a sample obtained by shaving off a ca. 500 µm thick phosphor layer in a depth of 100 µm from the surface side and that from the support side are each dissolved in water to form an aqueous solution. The respective aqueous solutions are subjected to ICP emission spectrometry to determine an activator content.

In the radiation image conversion panel according to this invention, the support is preferably comprised of at least two layers, and more preferably three layers. Thus, it is preferred to use a support comprising plural layers to obtain a support exhibiting a relatively low X-ray absorption and having superior flatness, and it is more preferred to form plural layers using a film sheet exhibiting an X-ray absorbance at 80 kVp of less than 10%.

In this invention, the support is preferably comprised of plural layers containing a carbon fiber plate, which is obtained by laminating thin film sheets achieving a precise plane flatness at the time of deposition together with a rigid carbon fiber plate. As a thin film sheet can be employed plastic material such as polyimide or PET (polyethylene terephthalate) as well as metals such as Cu (copper), Al (aluminum) and stainless steel.

In one preferred embodiment of this invention, the support comprises polyimide, carbon fiber plate and polyimide in that order, thereby resulting in enhanced advantages of this invention.

Polyimide film, for example, Mictron Film or Capton Film (available from Toray Co.) can be employed, which is laminated onto a carbon fiber plate and molded to prepare a support in the following manner. Thus, polyimide sheets, which were previously coated with an adhesive layer or bonded with a adhesive sheet are laminated onto the carbon fiber plate. Alternatively, a carbon fiber plate impregnated with epoxy resin or bismaleimide resin is sandwiched between polyimide sheets and then molded using a molding machine at a temperature of 150 to 300° C. and a pressure of 9.8×10⁵ to 6.9×10⁶ Pa over a period of 15 min. to 3 hr. The three-layered support of polyimide/carbon resin fiber plate/polyimide used in Examples, described later was prepared according to the latter method.

As polyimide sheet, a thickness of at least 50 µm is preferred to reduce protrusions on the support surface and a thickness up to 200 µm is preferred in terms of handling. As carbon fiber plate, a thickness of at least 0.1 mm is preferred in terms of rigidity and a thickness up to 5 mm is preferred in X-ray absorption.

The stimulable phosphor used in this invention preferably is one represented by the following formula (1):

$$M^1X \cdot aM^2X' \cdot bM^3X'' :eA \text{ formula} \tag{1}$$

wherein $M^1$ is at least one alkali metal atom selected from the group consisting of Li, Na, K, Rb and Cs; $M^2$ is at least one divalent metal atom selected from the group consisting of Be, Mg, Ca, Sr, Ba, Zn, Cd, Cu and Ni; $M^3$ is at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; X, X' and X'' are each a halogen atom selected from the group consisting of F, Cl, Br and I; A is a metal atom selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are each $0 \leq a < 0.5$, $0 \leq b < 0.5$ and $0 < e \leq 0.2$.

In the formula (1), $M^1$ is at least one alkali metal atom selected from the group consisting of Li, Na, K, Rb and Cs, preferably at least one alkali metal atom selected from Rb and Cs atoms, and more preferably Cs atom.

$M^2$ represents a divalent metal selected from the group consisting of Be, Mg, Ca, Sr, Ba, Zn, Cd, Cu and Ni. Of these, a divalent metal selected from the group consisting of Be, Mg, Ca, Sr, and Ba is preferred.

$M^3$ represents a trivalent metal selected from the group consisting of Sc, Y, La, Ce, Pr, Nd, Pm, Sm, Eu, Gd, Tb, Dy, Ho, Er, Tm, Yb, Lu, Al, Ga. Of these, a trivalent metal selected from the group consisting of Y, Ce, Sm, Eu, Al, Gd, Lu, Ga and In is preferred.

A represents a metal selected from the group consisting of Eu, Tb, In, Ce, Tm, Dy, Pr, Ho, Nd, Yb, Er, Gd, Lu, Sm, Y, Tl, Na, Ag, Cu and Mg.

X, X' and X'' are each at least one halogen atom selected from the group consisting of F, Cl, Br and I, preferably at least one halogen atom selected from F, Cl and Br, and more preferably Br in terms of enhancing stimulated emission of a stimulable phosphor.

In the formula (1), "a" is $0 \leq a < 0.5$ and preferably $0 \leq a < 0.01$; "b" is $0 \leq b < 0.5$, and preferably $0 \leq b \leq 0.01$; "e" is $0 < e \leq 0.2$, and preferably $0 < e \leq 0.1$.

The foregoing stimulable phosphor preferably is one represented by the following formula (2):

$$M^1X :eA \text{ formula} \tag{2}$$

wherein $M^1$, X, A and e are each the same as defined in the foregoing formula (1).

The stimulable phosphor represented by the formula (1) can be prepared, for example, in the following manner.

First, an acid (HI, HBr, HCl or HF) is added to a carbonate so as to form a composition of a phosphor raw material described below and after mixed with stirring, the mixture is filtered at a point of neutralization, and the filtrate was evaporated to obtain crystals having the following composition.

As phosphor raw material, at least one compound selected from each of the following groups (a) and (b), and a compound containing a metal atom selected from the following group (c) are used:

(a) NaF, NaCl, NaBr, NaI, KF, KCl, KBr, KI, RbF, RbCl, RbBr, RbI, CsF, CsCl, CsBr, and CsI;

(b) $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2 \cdot 2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$ and $NiI_2$;

(c) Eu, Tb, In, Cs, Ce, Tm, Dy, Pr, Ho, Nd, Yb, Er, Gd, Lu, Sm, Y, Tl, Na, Ag, Cu and Mg.

As activator raw material, a compound containing a metal atom selected from the following group (d) is used:

(d) Eu, Tb, In, Cs, Ce, Tm, Dy, Pr, Ho, Nd, Yb, Er, Gd, Lu, Sm, Y, Ti, Na, Ag, Cu and Mg.

Phosphor raw materials, which have been selected from the foregoing (a) to (c) so as to have mixing composition meeting the numerical range, as defined in this invention are weighed and dissolved in pure water. In this regard, there may be conducted sufficient mixing using a mortar, ball mill or mixer mill. Next, a prescribed amount of an acid is added to adjust a pH value (C) of the thus obtained solution so as to fall within the range of 0<C<7, and then any water is vaporized.

Further, the obtained raw material mixture is charged into a heat-resistant vessel such as a silica port, an alumina crucible or a silica crucible and then placed in an electric furnace to be calcined. The calcination temperature preferably is 500 to 1000° C. The calcination time, depending on a charging amount of raw materials, calcination temperature and the like, preferably is 0.5 to 6 hrs. As a calcinations atmosphere is employed a weakly reducible atmosphere such as a nitrogen gas atmosphere containing a small amount of hydrogen gas or a carbon dioxide atmosphere containing carbon monoxide, a nitrogen gas atmosphere, a neutral atmosphere such as an argon gas atmosphere, or a trace amount of oxygen-introduced weakly oxidizing atmosphere.

After completion of calcination under the foregoing condition, calcined material is taken out of the electric furnace and subjected to pulverization. Thereafter, powdery calcined material may again be charged into a heat resistant vessel and then placed in an electric furnace to be calcined under the foregoing condition to further enhance emission luminance of the phosphor. When the calcined material is allowed to cool from calcination temperature to room temperature, the intended phosphor can be obtained by being taken out the calcined material from an electric furnace and allowing it to stand in an aerial atmosphere. In this regard, the calcined material may be cooled in the same atmosphere as in the calcination, such as a weakly reducing atmosphere or neutral atmosphere. Alternatively, the calcined material is moved from a heating section to a cooling section within the electric furnace, followed by being rapidly cooled in a weakly reducing atmosphere, neutral atmosphere or weakly oxidizing atmosphere, thereby leading to further enhanced stimulated emission luminance of the phosphor.

The stimulable phosphor layer relating to this invention is a layer of vapor deposited stimulable phosphor and is formed by vapor deposition (or vapor-phase deposition process). The phosphor layer being formed by a process of vapor deposition means that the phosphor layer is formed by a process comprising depositing a stimulable phosphor on the support in the vapor phase to form the stimulable phosphor layer. Thus, the stimulable phosphor is deposited on the support in the vapor phase deposition process to form the phosphor layer (preferably having a thickness of 50 μm to 20 mm).

A vacuum evaporation method, a sputter deposition method, a CVD (chemical vapor deposition) method, ion plating method and other methods have been employed to deposit the stimulable phosphor on the support to form a stimulable phosphor layer.

The foregoing methods are conducted in the manner described below.

Vacuum evaporation is conducted in such a manner that after placing a support in an evaporation apparatus, the inside of the apparatus is evacuated to a vacuum degree of $1.333 \times 10^{-4}$ Pa and subsequently, at least a stimulable phosphor is evaporated with heating by the resistance heating method or electron-beam method to cause the phosphor to be deposited at a slant on the surface of the support to a desired thickness. As a result, a stimulable phosphor layer containing no binder is formed, provided that the foregoing evaporation stage may be divided into plural times to form the stimulable phosphor layer. In this evaporation stage, plural resistance heaters or electron beams may be used to perform vacuum evaporation. Alternatively, raw material of a stimulable phosphor is evaporated using plural resistance heaters or electron beams and the intended stimulable phosphor is synthesized on the support, simultaneously forming a stimulable phosphor layer. After completion of vapor evaporation, a radiation image conversion panel of this invention can be prepared by optionally providing a protective layer on the opposite side of the stimulable phosphor layer to the support. Vacuum evaporation may be conducted while cooling or heating the substrate to be deposited thereon. After completion of vacuum evaporation, the stimulable phosphor layer may be subjected to a heating treatment. In vapor evaporation, a gas such as $O_2$ or $H_2$ may optionally be introduced to perform reactive vapor evaporation.

Sputter deposition is conducted in such a manner that after setting a support in a sputtering apparatus, the inside of the apparatus is evacuated to a vacuum level of $1.333 \times 10^{-4}$ Pa and then inert gas used for sputtering such as Ar and Ne is introduced therein at a gas pressure of ca. $1.333 \times 10^{-1}$ Pa, subsequently, sputtering is carried out with targetting the stimulable phosphor to cause the phosphor to be deposited on the slanted surface of the support so as to have a desired thickness. Similarly to the vacuum evaporation, various treatments may be applied.

Further, there are also applicable the CVD method and ion plating method.

The growth rate of a stimulable phosphor layer in the vapor deposition preferably is 0.05 to 300 μm/min. A growth rate of less than 0.05 μm/min results in lowered productivity of the radiation image conversion panel of this invention and is not preferable. In the case of a growth rate of more than 300 μm/min, it is difficult to control the growth rate and is not unsuitable.

A radiation image conversion panel which has been prepared by the vapor evaporation method or sputter deposition method contains no binder, leading to increased filling density of the stimulable phosphor layer and thereby a radiation image conversion panel with enhanced sensitivity and sharpness can be obtained.

A thickness of the stimulable phosphor layer, depending on the intended use of the radiation image conversion panel and the kind of stimulable phosphor, preferably is 50 μm to 1 mm, more preferably 50 to 300 μm, still more preferably 100 to 300 μm, and optimally 150 to 300 μm.

In the formation of a stimulable phosphor layer by the vapor deposition process, a support on which the stimulable phosphor layer is to be formed, is preferably heated at a temperature of 100° C. or higher, more preferably 150° C. or higher, and still more preferably 150 to 400° C.

The reflectance of a stimulable phosphor layer preferably is not less than 20%, more preferably not less than 30%, and still more preferably not less than 40%, with an upper limit of 100%. Further, spacing between columnar crystals may be filled with a filler such as a binder to strengthen the phosphor layer. Furthermore, material exhibiting relatively high light absorbance or high reflectance may be used as filler. The use thereof prevents lateral diffusion of stimulating light entering the phosphor layer, in addition to the foregoing strengthening effect.

Next, formation of the stimulable phosphor of this invention will be described based on FIGS. 1 and 2. FIG. 1 exemplarily shows a sectional view of a stimulable phosphor layer having columnar crystals formed on the support (including an adhesive layer). In the FIG. 1, the numeral 11 designates a support; the numeral 12, a stimulable phosphor layer; the number 12', an adhesive layer; and numeral 13, columnar crystals forming the stimulable phosphor layer. The numeral 14 indicates spacing between columnar crystals.

Figure 2:
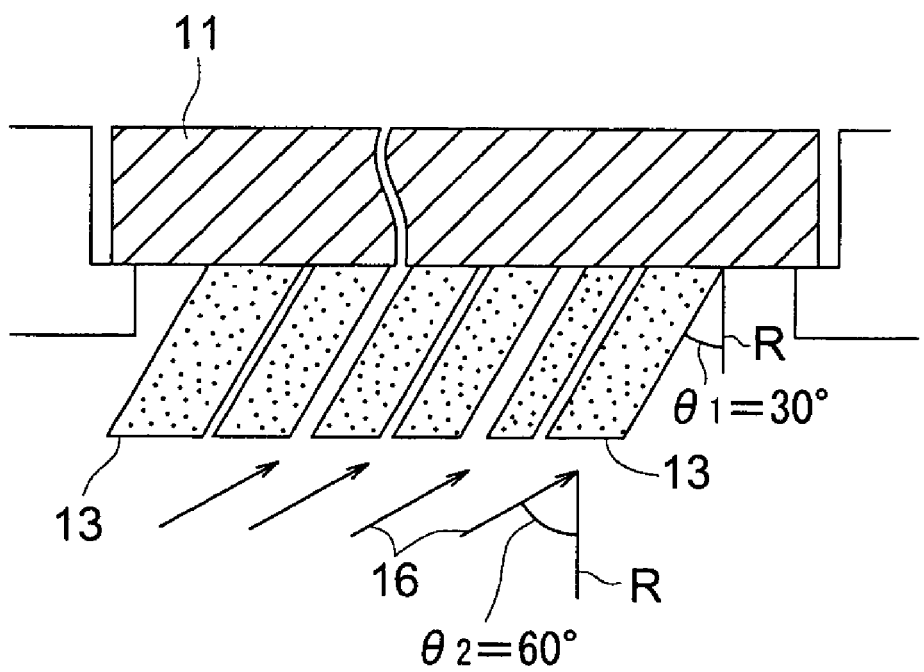
FIG. 2 illustrates the mode of forming a stimulable phosphor layer on a support by the vapor deposition method.

FIG. 2 illustrates the mode of forming a stimulable phosphor layer on a support by the vacuum evaporation method, in which vapor streams (16) of a stimulable phosphor are introduced at an incident angle $\theta_2$ (in the Figure, 60°) to the line (R) normal to the support surface to form columnar crystals on the support, at an angle of $\theta_1$ (in the Figure, 30°, empirically, about a half of the incident angle).

The stimulable phosphor layer formed on the support contains no binder, leading to superior directionality and enhanced directionality of stimulating light and stimulated luminescence and enabling formation of a thicker phosphor layer, as compared to radiation image conversion panel having a dispersion-type stimulable phosphor layer, in which a stimulable phosphor is dispersed in a binder. Moreover, reduced scattering of stimulating light in the stimulable phosphor layer results in enhanced sharpness.

Further, spacing between columnar crystals may be filled with a filler such as a binder to strengthen the phosphor layer. Furthermore, material exhibiting relatively high light absorbance or high reflectance may be used as filler. The use thereof prevents lateral diffusion of stimulating light entering the phosphor layer, in addition to the foregoing strengthening effect. Material exhibiting high reflectance refers to one exhibiting a high reflectance with respect to stimulating light (500 to 900 nm, specifically 600 to 800 nm), including metals such as aluminum, magnesium, silver and indium, white pigments and colorants ranging green to red.

White pigments can also reflect stimulating light. Examples thereof include $TiO_2$ (anatase type, rutile type), MgO, $PbCO_3$, $Pb(OH)_2$, $BaSO_4$, $Al_2O_3$, M(II)FX [in which M(II) is at least one of Ba, Sr and Ca, X is at least one of Cl and Br], $CaCO_3$, ZnO, $Sb_2O_3$, $SiO_2$, $ZrO_2$, lithopone ($BaSO_4 \cdot ZnS$) magnesium silicate, basic lead silisulfate, and aluminum silicate. These white pigments exhibit high covering power and have a refractive index high, whereby stimulated luminescence is easily scattered through reflection or refraction, leading to enhanced sensitivity of the radiation image conversion panel.

Examples of material exhibiting high light absorbance include carbon, chromium oxide, nickel oxide, iron oxide, and blue colorants. Of these, carbon absorbs stimulated luminescence.

Colorants may be any organic or inorganic colorants. Examples of organic colorants include Zapon Fastblue 3G (produced by Hoechst A. G.), Estrol Brillblue N-3RL (produced by Sumitomo Chemical Ind. Co.Ltd.), D6CBlue No. 1 (produced by National Aniline Co.), Spirit Blue (produced by HODOGAYA KAGAKU Co., Ltd.), Oilblue No. 603 (produced by Orient Co., Ltd.), Kiton Blue A (produced by Chiba Geigy Co.), Aisen Catironblue GLH (produced by HODOGAYA KAGAKU Co., Ltd.), Lakeblue AFH (produced by KYOWA SANGYO Co., Ltd.), Primocyanine 6GX (produced by INAHATA SANGYO Co. Ltd.), Briilacid Green 6BH (produced by HODOGAYA KAGAKU Co., Ltd.), Cyanblue BNRCS (produced by Toyo Ink Co., Ltd.), and Lyonoyl Blue SL (produced by Toyo Ink Co., Ltd.). There are also cited organic metal complex colorants such as Color Index 24411, 23160, 74180, 74200, 22800, 23154, 23155, 24401, 14830, 15050, 15760, 15707, 17941, 74220, 13425, 13361, 13420, 11836, 74140, 74380, 74350 and 74460. Examples of inorganic colorants include ultramarine, cobalt blue, celureun blue, chromium oxide, and $TiO_2$—ZnO—NiO type pigments.

The stimulable phosphor layer may be provided thereon with a protective layer. The protective layer may be formed by coating a coating composition for the protective layer on the stimulable phosphor layer or the protective layer which was previously prepared may be adhered to the support. Alternatively, a procedure of forming a stimulable phosphor layer on the protective layer which was previously prepared is also applicable. Materials used for the protective layer include those which are usually used for protective layers. Examples thereof include cellulose acetate, nitrocellulose, polymethyl methacrylate, polyvinyl butyral, polyvinyl formal, polycarbonate, polyeater, polyethylene terephthalate, polyethylene, polyvinylidene chloride, nylon, polytetrafluoroethylene, polytrifluoroethylene, copolymer of terafluoroethylene and hexafluoropropylene, copolymer of vinylidene chloride and vinyl chloride, and copolymer of vinylidene chloride and acrylonitrile. Further, a transparent glass substrate may be used as a support. Furthermore, inorganic material such as SiC, $SiO_2$, SiN, and $Al_2O_3$ may be allowed to deposit by means of the vacuum evaporation or sputtering method to form the protective layer. The thickness of a protective layer is preferably 0.1 to 2,000 μm.

Figure 3:
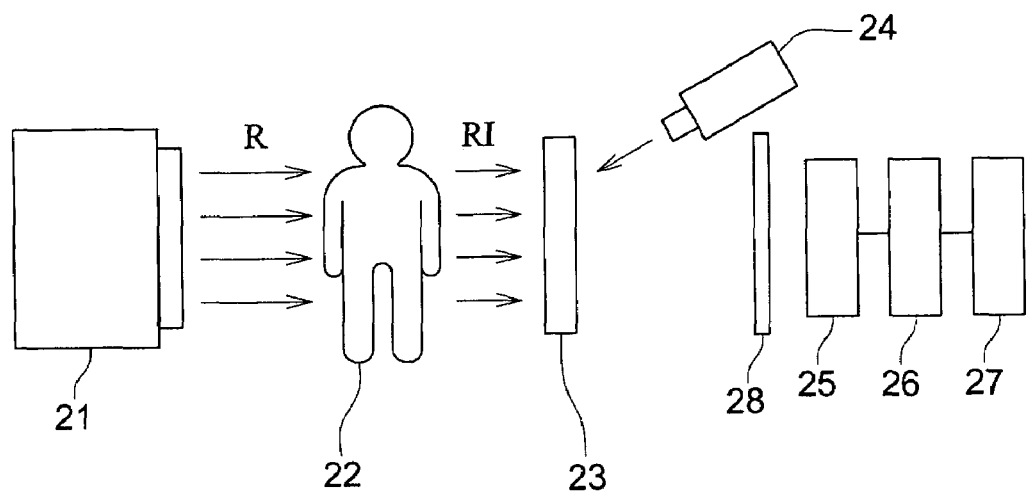
FIG. 3 shows an example of obtaining a transmission-type radiation image using a radiation image conversion panel according to the invention.

FIG. 3 illustrates a constitution of a radiation image conversion panel of this invention. In FIG. 3, the numeral 21 designates a radiation generating apparatus, 22 designates an object, 23 designates a radiation image conversion panel having a visible- or infrared-stimulable phosphor layer, 24 designates a stimulating light source to cause a latent image stored in the radiation image conversion panel (23) to be emitted as stimulated luminescence, 25 designates a photoelectric conversion apparatus to detect the stimulated luminescence emitted from the radiation image conversion panel (23), 26 designates an image reproduction apparatus to reproduce photoelectric conversion signals detected in the photoelectric conversion apparatus (25) in the form of an image, 27 designates a display apparatus to display reproduced images, and 28 designates a filter for reflected light from a light source (24) to allow only light emitted from the radiation image conversion panel (23) to pass therethrough. FIG. 3 shows an example of obtaining a transmission-type radiation image, and in cases where the object (22) itself radiates radiation, a radiation generation apparatus (21) may not be required. An apparatus subsequent to the photoelectric conversion (25) apparatus may be any one that is capable of reproducing light information from the radiation image conversion panel (23), in any image form.

As shown in FIG. 3, when the object (22) is arranged between the radiation generation apparatus (21) and the radiation image conversion panel (23), and exposed to radiation (R), the radiation (R) transmits the respective portions of the object (22) in accordance with radiation transmittance thereof and the resulting transmission image (RI), i.e., an image having different radiation intensities enters the radiation image conversion panel (23). The thus entered transmission image (RI) is absorbed in a stimulable phosphor layer of the radiation image conversion panel (23), in which electrons and/or holes are generated in proportion to the dose of the absorbed radiation and accumulated at a trap level of the stimulable phosphor to form a latent image accumulating energies of the radiation transmission image. Subsequently, the latent image is excited with light energy to form an actual image, i.e., the stimulated phosphor layer is irradiated with the light source (24) irradiating visible or infrared light to eject the electrons and/or holes accumulated on the trap level to emit the accumulated energy in the form of stimulated luminescence. The intensity of the emitted luminescence is proportional to the number of accumulated electrons and/or holes, that is, energy of the radiation absorbed in the stimulable phosphor of the radiation image conversion panel (23). The thus obtained light signals are converted to electric signals by the photoelectric conversion (25) apparatus such as a photomultiplier, which are reproduced as an image in image processor (26), displaying the image in image display apparatus (27). As the image processor (26), it is effective to employ one which not only reproduces the electric signals as the image signal but one which can also conduct image processing, computation, memory and storage of the image.

The stimulated luminescence emitted from the stimulable phosphor layer, having a spectral distribution in the lower wavelength region is preferable, based on the reason that the stimulated luminescence emitted from the stimulable phosphor layer is required to be separated from the reflected stimulating light and photoelectric converters to receive the luminescence emitted from the stimulable phosphor layer, in general, are provided with a sensor having higher sensitivity to light energy of 600 nm or less. Emission of stimulable phosphors relating to the invention falls within the wavelength region of 300 to 500 nm and the stimulating light wavelength is 500 to 900 nm, satisfying the foregoing conditions. Further, along with a recent trend of down-sizing diagnostic apparatuses, semiconductor lasers which exhibit a higher output and are capable of being further down-sized are preferably employed for use in reading images of the radiation image conversion panel. The semiconductor laser has a wavelength of 680 nm and the stimulable phosphor used in the radiation image conversion panel of the invention exhibits extremely superior sharpness when using a stimulating light of 680 nm. Thus, the stimulable phosphors relating to the invention emit luminescence having a main peak at 500 nm or less, which is easily separable from the stimulating light and compatible with spectral sensitivity of the receiver, leading to enhanced light-receiving efficiency and enhanced sensitivity of an image receiving system.

Light sources including the stimulating wavelength for the stimulable phosphor used in the radiation image conversion panel (23) are used as the stimulating light source (24). Specifically, the use of laser light simplifies an optical system and leads to enhanced stimulating light intensity, resulting in preferable performance. Examples of the laser include an He-Ne laser, He-Cd laser, Ar ion laser, Kr laser, $N_2$ laser, YAG laser and its second harmonic wave, ruby laser, semiconductor laser, various dye lasers, and metal vapor lasers such as a copper vapor laser. Of these, continuous oscillation lasers such as an He—Ne laser and an Ar ion laser are usually desirable, and pulse-oscillated lasers are also usable by synchronizing the pulse with a scanning time for one pixel of the panel. In cases when employing retarded emission for separation, instead of using the filter (28), the use of the pulse-oscillated laser is preferable rather than modulation of the continuous oscillation laser, as described in JP-A No. 59-22046. Of the various laser light sources described above, semiconductor lasers are specifically preferred in terms of being compact, inexpensive and not requiring a modulator.

The filter (28) cuts reflected stimulating light and allows the stimulated luminescence emitted from the radiation image conversion panel (23) to transmit, which is determined by the combination of the stimulated emission wavelength of a stimulable phosphor contained in the radiation image conversion panel (23) and the stimulating light source (24). In the preferred practical combination of a stimulating light wavelength of 500 to 900 nm with a stimulated emission wavelength of 300 to 500 nm, for example, violet to blue glass filters are used, such as C-39, C-40, V-40, V-42 and V-44 (available from TOSHIBA CORP.), 7-54 and 7-59 (available from Corning Co.), BG-1, BG-3, BG-25, BG-37 and BG-38 (available from Spectrofilm Co.). Interference filters are usable by selecting specific filters. The photoelectric conversion apparatus (25) usable in the invention includes any one capable of converting variation of luminous energy to electric signal, such as a photoelectric tube, a photomultiplier, a photodiode, a phototransistor, a solar cell, and photoconductive elements.

EXAMPLES

The present invention will be further described based on examples but embodiments of the invention are by no means limited to these examples.

Example 1

Preparation of Radiation Image Conversion Panel

Figure 4:
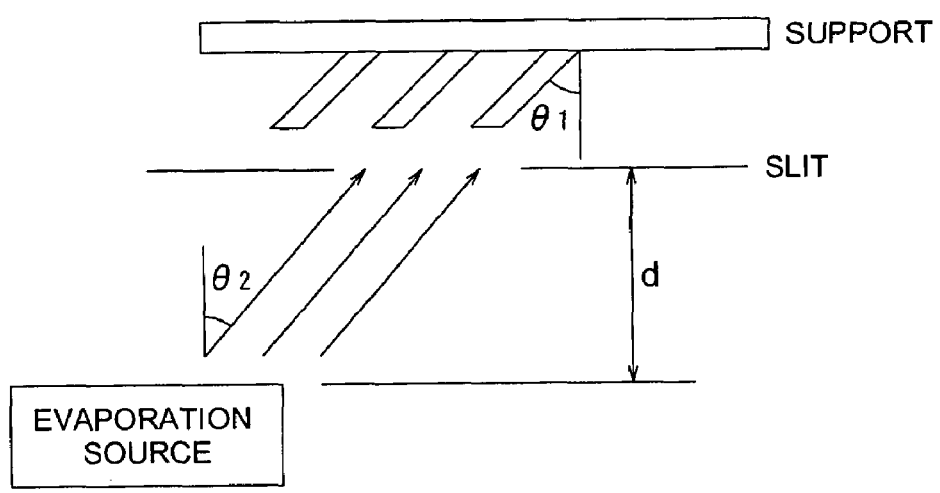
FIG. 4 illustrates formation of a stimulable phosphor layer by vapor deposition.

Onto a 1 mm thick carbon fiber (#132, produced by Toho Rayon Co., Ltd) transporting at a sped of 1.0 m/min, a 10 mm thick glass (produced by Nippon Denki Glass Co., Ltd.) was laminated by applying thereto a heated pressure roll at 130° C. and a pressure of 4.9×10 N/cm to obtain a substrate. Using a vapor deposition apparatus, as shown in FIG. 4 (in which $\theta_1=5°$ and $\theta_2=5°$ were respectively set), a stimulable phosphor was allowed to deposit on the glass surface of the substrate to form a stimulable phosphor layer. Vapor deposition was performed by introducing the phosphor using an aluminum slit at a distance (d) of 60 cm between the substrate and the slit with transporting the substrate in the direction parallel to the substrate surface to form a 300 μm thick stimulable phosphor layer.

In the vapor deposition, the support was set in the evaporation chamber of an evaporator and then, phosphor raw material, as an evaporation source (CsBr:Eu) which was previously molded in a press was put into a water-cooled crucible. Thereafter, the inside of the evaporator was evacuated and after introducing $N_2$ gas to adjust a degree of vacuum of 0.133 Pa, vacuum evaporation was conducted to perform vapor deposition, while maintaining the substrate temperature at 350° C. The vapor deposition was completed when the stimulable phosphor layer reached 300 μm thick and then, the phosphor layer was subjected to a heating treatment at 400° C. In a dry aerial atmosphere, a protective layer comprising a borosilicate glass was superposed on the phosphor layer, then, peripheral portions of the substrate and the protective layer ere sealed with an adhesive to prepare a radiation image conversion panel sample No. 1 (comparative example), comprising a phosphor layer having a shielded structure.

Radiation image conversion panel samples No. 2 through 7 were each prepared similarly to the foregoing sample 1, provided that the glass laminated on the carbon fiber was replaced by a polyimide (trade name Kapton, 10 μm thick, available form Toray Co.), PET (polyethylene terephthalate, 10 μm thick), Al (10 μm thick), Cu (10 μm thick), paraffin (10 μm thick) or amorphous graphite (10 μm thick), as shown in Table 1, together with a glass transition point (Tg) of the laminated material and thermal conductivity of the substrate.

Similarly, sample No. 8 was prepared, provided that the support was replaced by the three-layered support prepared as below. Thus, 2 mm thick carbon fiber plate (CFRP plate, available from Toray Co.) was sandwiched between polyimide sheets and molded at a pressure of 20 kg/cm² and a temperature of 200° C. for 15 min. Thereafter, cooling was gradually conducted until reached 100° C. and a three-layered support was obtained.

Sample No. 9 was prepared similarly to sample No. 4, provided that the support was replaced by the two-layered support prepared as below. An optimum amount of polyvinyl alcohol (M.W., 20,000) was put on a polyimide sheet and further thereon, the carbon fiber plate (CFRP plate, available from Toray Co.) was laminated at a temperature of 150° C. to obtain a two-layered support.

The carbon fiber plate (2 mm thick) described above exhibited a glass transition temperature of 180° C. and the polyimide sheet (Mictron film, available from Toray-Du Pont) being 100 μm thick and exhibiting a glass transition temperature of 280° C.

The thus obtained radiation image conversion panel samples No. 1 through 7 were each evaluated in the following manner.

Evaluation of Sharpness

Modulation transfer function (MTF) was determined for each of the radiation image conversion panel samples to evaluate sharpness. Thus, after a CTF chart was adhered to the respective radiation image conversion panels, each of the panels was exposed at 10 mR of 80 kVp X-rays (at a distance to the object: 1.5 m). Thereafter, sample were each scanned with a semiconductor laser light beam (690 nm, a power of 40 mW on the panel) of 100 μm diameter to read it. As shown in Table 1, MTF values (sharpness) of the respective panels were represented by the sum of the MTF values at 2.0 lp/mm.

Evaluation of Luminance and Luminance Distribution

Samples were each evaluated with respect to luminance, using Regius 350, trade name, produced by Konica Corp. Thus, similarly to the foregoing sharpness evaluation, radiation image conversion panel samples were each exposed to X-rays of a tungsten bulb at 80 kVp and 10 mAs and at a distance an X-ray source and the sample plate, and thereafter, the sample plate was set on the Regius 350 and read. Evaluation was made from electric signals obtained by a photomultiplier.

Distribution of electric signals within the exposed panel plate, obtained from the photomultiplier was evaluated. Thus, a standard deviation of the luminance distribution was determined for each panel sample (which was also denoted simply as S.D.). The less value indicates superior homogeneity of an activator.

The thermal conductivity was determined in accordance with the method and a measurement apparatus, as described earlier.

TABLE 1

| Sample No. | Laminated Material | Tg (° C.) | Thermal Conductivity (W/mK) | Luminance | MTF (2lp/mm) (%) | S.D | Remark |
|---|---|---|---|---|---|---|---|
| 1 | Glass | 450 | 28.5 | 0.77 | 11 | 18 | Comp. |
| 2 | Al | 400 | 240 | 0.82 | 13 | 10 | Comp. |
| 3 | Cu | 440 | 395 | 0.34 | 7 | 7 | Comp. |
| 4 | Polyimide | 330 | 0.27 | 1.67 | 33 | 8 | Inv. |
| 5 | PET | 130 | 0.34 | 1.55 | 32 | 6 | Inv. |
| 6 | Paraffin | 135 | 0.24 | 1.68 | 34 | 4 | Inv. |
| 7 | Amorphous Graphite | 350 | 2.2 | 1.32 | 37 | 7 | Inv. |
| 8 | Polyimide/ Carbon Fiber/ Polyimide | 280 | 0.27 | 1.92 | 43 | 3 | Inv. |
| 9 | Polyimide/ Carbon Fiber | 280 | 0.27 | 2.03 | 42 | 5 | Inv. |

As can be seen from Table 1, it was proved that inventive samples led to superior results, as compared to comparative samples.

What is claimed is:

1. A radiation image conversion panel comprising on a support at least one stimulable phosphor layer comprising a stimulable phosphor,
   wherein the stimulable phosphor layer is a layer of vapor-deposited stimulable phosphor having a thickness of 50 μm to 20 mm,
   the support exhibits a thermal conductivity of 0.1 to 20 W/mK, and
   wherein the support is comprised of plural layers, an uppermost layer of the plural layers exhibits a glass transition temperature of 80 to 350° C., and a the support is comprised of a polyimide layer, a carbon fiber plate layer and a polyimide layer in that order.

2. The radiation image conversion panel of claim 1, wherein the uppermost layer is a polyimide layer.

3. The radiation image conversion panel of claim 1, wherein the stimulable phosphor is represented by the following formula (1):

$$M^1X.aM^2X'.bM^3X'':eA \qquad \text{formula (1)}$$

wherein $M^1$ is at least one alkali metal atom selected from the group consisting of Li, Na, K, Rb and Cs; $M^2$ is at least one divalent metal atom selected from the group consisting of Be, Mg, Ca, Sr, Ba, Zn, Cd, Cu and Ni; $M^3$ is at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; X, X' and X" are each a halogen atom selected from the group consisting of F, Cl, Br and I; A is a metal atom selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are each $0 \leq a < 0.5$, $0 \leq b < 0.5$ and $0 < e \leq 0.2$.

4. The radiation image conversion panel of claim 3, wherein in the formula (1), $M^1$ is at least one alkali metal atom selected from the group consisting of Rb and Cs.

5. The radiation image conversion panel of claim 3, wherein in the formula (1), X is a halogen atom selected from the group consisting of F, Cl and Br.

6. The radiation image conversion panel of claim 3, wherein the stimulable phosphor is represented by the following formula (2):

formula (2)

$$M^1X:eA \qquad \text{formula (2)}$$

wherein $M^1$, X, A and e are each the same as defined in formula (1).

7. A method of preparing a radiation image conversion panel comprising on a support a stimulable phosphor layer, the method comprising:
depositing a stimulable phosphor on the support by vapor deposition to form the stimulable phosphor layer,
wherein the stimulable phosphor layer has a thickness of 50 μm to 20 mm,
the support exhibits a thermal conductivity of 0.1 to 20 W/mK, and
wherein the support is comprised of plural layers, an uppermost layer of the plural layers exhibits a glass transition temperature of 80 to 350° C., and the support is comprised of a polyimide layer, a carbon fiber plate layer and a polyimide layer in that order.

8. The method of claim 7, wherein the uppermost layer is a polyimide layer.

9. The method of claim 7, wherein the stimulable phosphor is represented by the following formula (1):

$$M^1X.aM^2X'.bM^3X'':eA \qquad \text{formula (1)}$$

wherein $M^1$ is at least one alkali metal atom selected from the group consisting of Li, Na, K, Rb and Cs; $M^2$ is at least one divalent metal atom selected from the group consisting of Be, Mg, Ca, Sr, Ba, Zn, Cd, Cu and Ni; $M^3$ is at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; X, X' and X" are each a halogen atom selected from the group consisting of F, Cl, Br and I; A is a metal atom selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are each $0 \leq a < 0.5$, $0 \leq b < 0.5$ and $0 < e \leq 0.2$.

10. The method of claim 9, wherein in the formula (1), $M^1$ is at least one alkali metal atom selected from the group consisting of Rb and Cs.

11. The method of claim 9, wherein in the formula (1), X is a halogen atom selected from the group consisting of F, Cl and Br.

12. The method of claim 9, wherein the stimulable phosphor is represented by the following formula (2):

$$M^1:eA \qquad \text{formula (2)}$$

wherein $M^1$, X, A and e are each the same as defined in formula (1).

* * * * *